US011717979B2

(12) United States Patent
Beauchamp et al.

(10) Patent No.: US 11,717,979 B2
(45) Date of Patent: Aug. 8, 2023

(54) SYSTEM AND METHOD FOR CUTTING A METALLIC FILM

(71) Applicant: BLUE SOLUTIONS CANADA INC., Boucherville (CA)

(72) Inventors: Jacques Beauchamp, Boucherville (CA); Philippe Fusey, Boucherville (CA)

(73) Assignee: BLUE SOLUTIONS CANADA INC., Boucherville (CA)

(*) Notice: Subject to any disclaimer, the term of this patent is extended or adjusted under 35 U.S.C. 154(b) by 183 days.

(21) Appl. No.: 17/004,504

(22) Filed: Aug. 27, 2020

(65) Prior Publication Data

US 2021/0060808 A1    Mar. 4, 2021

Related U.S. Application Data

(60) Provisional application No. 62/892,461, filed on Aug. 27, 2019.

(51) Int. Cl.
*B26D 3/08* (2006.01)
*B26D 7/20* (2006.01)
(Continued)

(52) U.S. Cl.
CPC .............. *B26D 3/085* (2013.01); *B21C 47/18* (2013.01); *B26D 7/204* (2013.01); *H01M 4/04* (2013.01);
(Continued)

(58) Field of Classification Search
CPC ......... B26D 3/085; B26D 7/204; H01M 4/04; H01M 4/382; H01M 2004/027; B21C 47/18
See application file for complete search history.

(56) References Cited

U.S. PATENT DOCUMENTS 3,871,269 A * 3/1975 Jones ..................... B65H 29/46
493/353
4,060,017 A * 11/1977 Backlund ............... B23D 15/00
83/167
(Continued)

FOREIGN PATENT DOCUMENTS

JP        2004296611        10/2004

OTHER PUBLICATIONS

International Search Report and Written Opinion issued in co-pending International application No. PCT/CA2020/051174 dated Oct. 6, 2020.

*Primary Examiner* — Evan H MacFarlane
*Assistant Examiner* — Fernando A Ayala
(74) *Attorney, Agent, or Firm* — BCF LLP

(57) ABSTRACT

A method for cutting a metallic film is disclosed. The method includes: feeding the metallic film between a scoring blade and an anvil at a first speed; feeding a first protective film between the metallic film and the scoring blade; feeding a second protective film between the metallic film and the anvil; moving the scoring blade toward the anvil for applying a pressure onto the first protective film, the metallic film, and the second protective film disposed between the scoring blade and the anvil for making a score along a width of the protective film; and pulling the metallic film having passed between the scoring blade and the anvil at a second speed. The second speed being greater than the first speed. A difference between the first and second speeds causes the metallic film to cut at the score. A system for cutting a metallic film is also disclosed.

21 Claims, 4 Drawing Sheets

(51) Int. Cl.
  *H01M 4/38* (2006.01)
  *H01M 4/04* (2006.01)
  *B21C 47/18* (2006.01)
  *H01M 4/02* (2006.01)

(52) U.S. Cl.
  CPC ...... *H01M 4/382* (2013.01); *H01M 2004/027* (2013.01)

(56) References Cited

U.S. PATENT DOCUMENTS

| | | | |
|---|---|---|---|
| 4,541,764 A * | 9/1985 | Govan | B65H 31/32 414/790.3 |
| 5,632,381 A * | 5/1997 | Thust | B07C 5/36 209/44.1 |
| 2005/0161486 A1* | 7/2005 | Lembo | E04B 1/7662 225/2 |
| 2006/0130435 A1* | 6/2006 | Hada | B65B 25/146 53/550 |
| 2006/0147166 A1* | 7/2006 | Roba | B65H 49/02 385/100 |
| 2009/0231783 A1 | 9/2009 | Matsumoto | |
| 2011/0089212 A1 | 4/2011 | Schmid et al. | |
| 2015/0029447 A1* | 1/2015 | Hirata | G02F 1/133533 359/487.01 |
| 2017/0212506 A1* | 7/2017 | Pfarr | B26D 5/007 |
| 2020/0280104 A1* | 9/2020 | Son | H01M 50/431 |
| 2020/0406401 A1* | 12/2020 | Breuer | H01M 4/139 |
| 2021/0078900 A1* | 3/2021 | Feng | C03B 29/10 |
| 2021/0394385 A1* | 12/2021 | Bjarnason | B26D 7/0625 |
| 2022/0001492 A1* | 1/2022 | Böhm | H01M 4/139 |

* cited by examiner

SYSTEM AND METHOD FOR CUTTING A METALLIC FILM

CROSS-REFERENCE

The present application claims priority to U.S. Provisional Patent Application No. 62/892,461, filed Aug. 27, 2019, the entirety of which is incorporated herein by reference.

FIELD OF TECHNOLOGY

The present technology relates to systems and methods for cutting metallic films.

BACKGROUND

Metallic films, such as those used for making anodes to be used in battery cells, are very fragile. As such, cutting these films to a desired length without causing tears, burs or significant deformations at the site of the cut is challenging. In some cutting processes, the metallic film may also stick to the cutting tool.

There is therefore a desire for a system and method for cutting a metallic film that addresses at least in part the above problems.

SUMMARY

It is an object of the present technology to ameliorate at least some of the inconveniences present in the prior art.

According to one aspect of the present technology, there is provided a system for cutting a metallic film. The system has a scoring blade; a scoring blade actuator operatively connected to the scoring blade for actuating the scoring blade; an anvil in alignment with the scoring blade; a first conveyor disposed upstream of the scoring blade and the anvil; a second conveyor disposed downstream of the scoring blade and the anvil, the first and second conveyors operating at a first speed; a metallic film feeder for feeding the metallic film on the first conveyor, the first conveyor feeding the metallic film between the scoring blade and the anvil, the second conveyor pulling the metallic film from between the scoring blade and the anvil; a first protective film feeder for feeding a first protective film between the metallic film and the scoring blade; a second protective film feeder for feeding a second protective film between the metallic film and the anvil, the scoring blade actuator being operable to move the scoring blade toward the anvil to apply a pressure onto the first protective film, the metallic film, and the second protective film disposed between the scoring blade and the anvil for making a score along a width of the protective film; and a third conveyor disposed downstream of the second conveyor, the second conveyor feeding the metallic films to the third conveyor, the third conveyor operating at a second speed, the second speed being greater than the first speed, a difference between the first and second speeds causing the metallic film to cut at the score.

In some embodiments of the present technology, a first air bridge is provided between the first conveyor and the anvil.

In some embodiments of the present technology, a second air bridge is provided between the anvil and the second conveyor.

In some embodiments of the present technology, a third air bridge is provided between the second and third conveyors.

In some embodiments of the present technology, the anvil is a cylindrical anvil. The cylindrical anvil is rotatable.

In some embodiments of the present technology, the scoring blade actuator is operable to translate the scoring blade toward the anvil.

In some embodiments of the present technology, the first protective film is thinner than the second protective film.

In some embodiments of the present technology, the first and second protective films are first and second plastic films.

In some embodiments of the present technology, the first and second plastic films are different plastic films.

In some embodiments of the present technology, the metallic film is a film of alkali metal or alloy thereof.

In some embodiments of the present technology, the first, second and third conveyors are vacuum belt conveyors.

In some embodiments of the present technology, the pressure applied onto the first protective film, the metallic film, and the second protective film disposed between the scoring blade and the anvil for making the score along the width of the protective film does not cut the first and second protective films.

In some embodiments of the present technology, the metallic film has a thickness at a site of the score between 1 micron and 30 microns.

According to another aspect of the present technology, there is provided a method for cutting a metallic film. The method comprises: feeding the metallic film between a scoring blade and an anvil at a first speed; feeding a first protective film between the metallic film and the scoring blade; feeding a second protective film between the metallic film and the anvil; moving the scoring blade toward the anvil for applying a pressure onto the first protective film, the metallic film, and the second protective film disposed between the scoring blade and the anvil for making a score along a width of the protective film; and pulling the metallic film having passed between the scoring blade and the anvil at a second speed. The second speed is greater than the first speed. A difference between the first and second speeds causes the metallic film to cut at the score.

In some embodiments of the present technology, the method further comprises removing the first and second protective films from the metallic film downstream of the cutting blade and upstream of a position where the metallic film cuts at the score.

In some embodiments of the present technology, the anvil is a cylindrical anvil. The method further comprises rotating the anvil.

In some embodiments of the present technology, moving the scoring blade toward the anvil comprises translating the scoring blade toward the anvil.

In some embodiments of the present technology, the first protective film is thinner than the second protective film.

In some embodiments of the present technology, the first and second protective films are first and second plastic films.

In some embodiments of the present technology, the first and second plastic films are different plastic films.

In some embodiments of the present technology, the metallic film is a film of alkali metal or alloy thereof.

In some embodiments of the present technology, the pressure applied onto the first protective film, the metallic film, and the second protective film disposed between the scoring blade and the anvil for making the score along the width of the protective film does not cut the first and second protective films.

In some embodiments of the present technology, the metallic film has a thickness at a site of the score between 1 micron and 30 microns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

A system 10 for cutting a metallic film 12 will be described below with reference to FIGS. 1 to 4. In some embodiments, the metallic film is a film of alkali metal, such as lithium, or alloy thereof. In some embodiments, the metallic film, once cut to the desired length, is used for making anodes to be used in battery cells.

Figure 1:
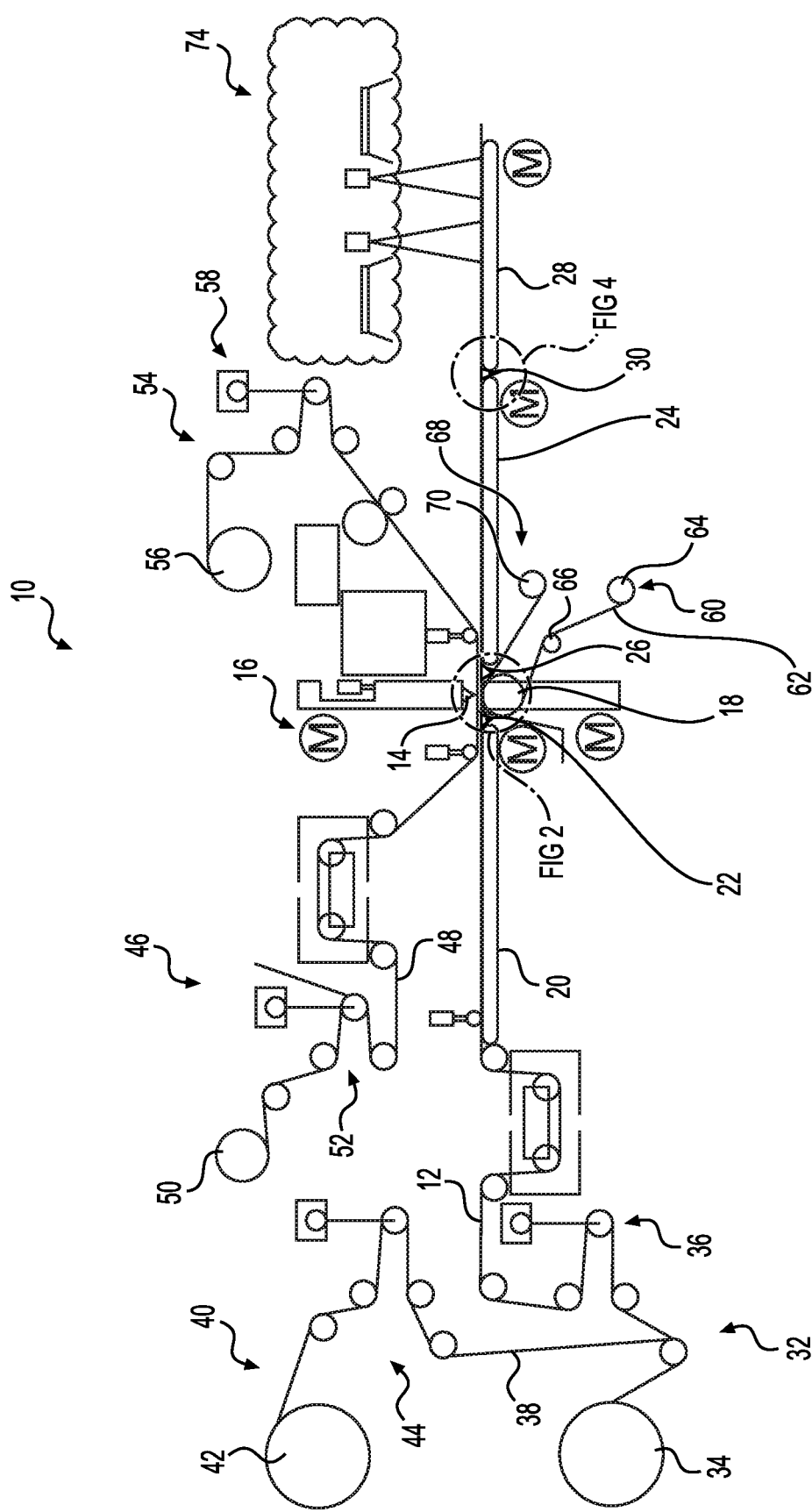
FIG. 1 is a schematic representation of a system for cutting a metallic film.

With reference to FIG. 1, the system 10 has a scoring blade 14 operatively connected to a scoring blade actuator 16. In the present embodiment, the scoring blade actuator 16 includes an electric motor connected to a cam actuation system which causes the scoring blade 14 to translate up and down. An anvil 18 is disposed below the scoring blade 14 in alignment with the scoring blade 14. In the present embodiment, the anvil 18 is a cylindrical anvil 18 that can be rotated such that the scoring blade 14 does not always apply pressure at the same location on the surface of the anvil 18. In some embodiments, it is contemplated that the anvil 18 could also be actuated to translate up and down.

Figure 2:
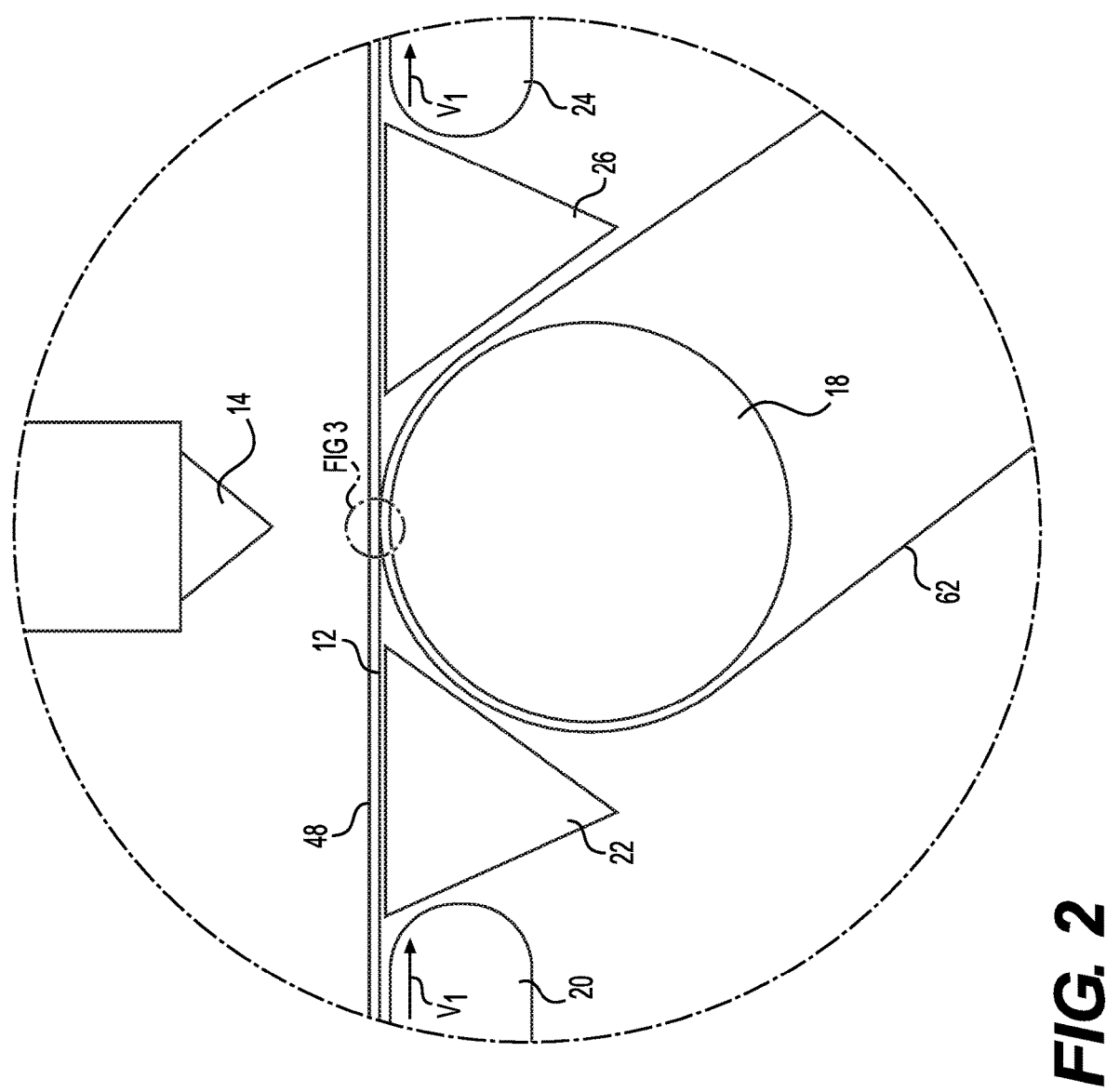
FIG. 2 is a close-up view of a portion of the system of FIG. 1 where scoring of the metallic film occurs.
Figure 4:
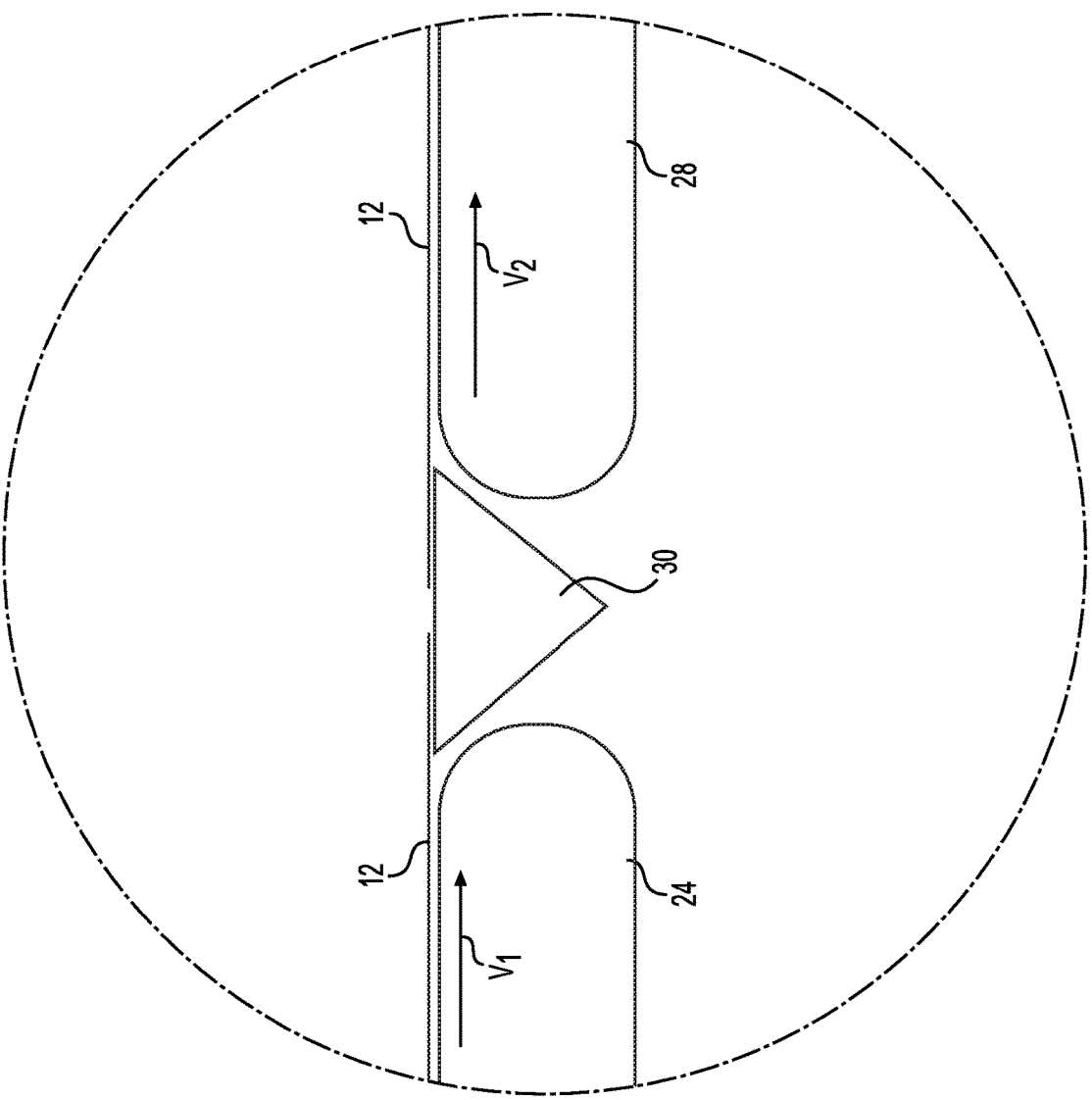
FIG. 4 is a close-up view of another portion of the system of FIG. 1 where cutting of the metallic film occurs.

A conveyor 20 is disposed upstream of the scoring blade 14 and the anvil 18. As best seen in FIG. 2, an air bridge 22 is disposed between the conveyor 20 and the anvil 18 to reduce or eliminate sagging of the metallic film 12 as it transitions from the conveyor 20 to the anvil 18 by blowing air under the metallic film 12. A conveyor 24 is disposed downstream of the scoring blade 14 and the anvil 18. As best seen in FIG. 2, an air bridge 26 is disposed between the anvil 18 and the conveyor 24 to reduce or eliminate sagging of the metallic film 12 as it transitions from the anvil 18 to the conveyor 24 by blowing air under the metallic film 12. A conveyor 28 is disposed downstream of the conveyor 24. As best seen in FIG. 4, an air bridge 30 is disposed between the conveyor 24 and the conveyor 28 to reduce or eliminate sagging of the metallic film 12 as it transitions from the conveyor 24 to the conveyor 28 by blowing air under the metallic film 12. As can be seen in FIGS. 2 and 4, the conveyors 20, 24 and 28 and the top of the anvil 18 are generally vertically aligned such that the metallic film 12 remains substantially flat as it travels through the system 10. In the present embodiment, the conveyors 20, 24 and 28 are vacuum belt conveyors. The conveyors 20 and 24 operate at a same speed V1 and the conveyor 28 operates at a speed V2 that is greater than the speed V1 of the conveyors 20 and 24 for reasons discussed below.

A metallic film feeder 32 feeds the metallic film 12 on the conveyor 20. The metallic film feeder 32 includes a spool 34 having metallic film 12 wound thereon and a plurality of rollers 36. The conveyor 20 feeds the metallic film 12 over the air bridge 22 and then between the scoring blade 14 and the anvil 18. The conveyor 24 pulls the metallic film 14 from between the scoring blade 14 and the anvil 18 and over the air bridge 26. The conveyor 24 then feeds the metallic film 12 over the air bridge 30 and to the conveyor 28.

In the present embodiment, the metallic film 12 wound on the spool 34 has a plastic film 38 on its surface to protect it and prevent it from sticking. A protective film winder 40, including a spool 42 and a plurality of rollers 44, removes the plastic film 38 from the metallic film 12 before the metallic film 12 reaches the conveyor 20 and winds the plastic film 38 on the spool 42.

A protective film feeder 46 feeds a protective film 48 onto the top surface of the metallic film 12 upstream of the scoring blade 14 such that the protective film 48 is fed between the metallic film 12 and the scoring blade 14. The protective film feeder 46 includes a spool 50 having the protective film 48 wound thereon and a plurality of rollers 52. A protective film winder 54, including a spool 56 and a plurality of rollers 58, removes the protective film 48 from the metallic film 12 downstream of the cutting blade 14 before the metallic film 12 reaches the conveyor 28 and winds the protective film 48 on the spool 56.

A protective film feeder 60 feeds a protective film 62 onto the anvil 18 such that the protective film 62 is fed between the metallic film 12 and the anvil 18. The protective film 62 is in contact with a bottom surface of the metallic film 12. The protective film feeder 60 includes a spool 64 having the protective film 62 wound thereon and a roller 66. A protective film winder 68, including a spool 70, removes the protective film 62 from the metallic film 12 downstream of the cutting blade 14 after the protective film 62 has passed over the top of the anvil 18 and winds the protective film 62 on the spool 70.

Figure 3:
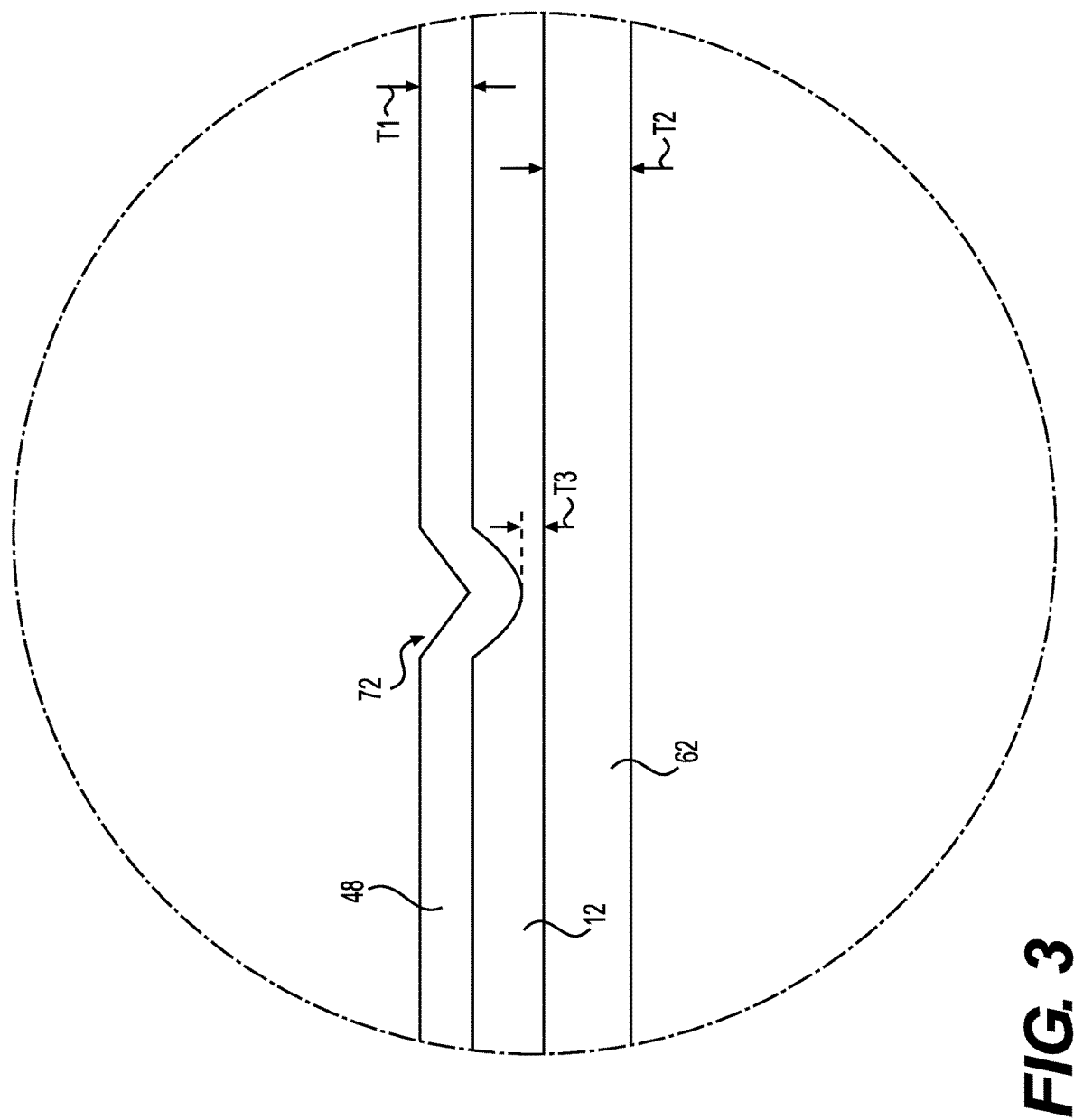
FIG. 3 is a close-up view of a portion of FIG. 2 schematically illustrating a score in the metallic film made by a scoring blade of the system of FIG. 1.

It should be noted that in FIGS. 2 and 4, the films 12, 48 and 62 are shown as lines that are spaced apart from each other, the metallic film 12 is shown as being spaced from the conveyors 20, 24 and 28 and the protective film 62 is shown as being spaced from the surface of the anvil 18. However, it should be understood that the films 12, 48 and 62 are actually in contact with each other (as shown in FIG. 3), the metallic film 12 is in contact with the conveyors 20, 24 and 28 and the protective film 62 is in contact with the surface of the anvil 18. The films 12, 48 and 62 have been illustrated as shown (i.e. spaced from other components) in order to distinguish the films 12, 48 and 62 in these figures.

With reference to FIG. 3, in the present embodiment, the protective film 48 has a thickness T1 and the protective film 62 has a thickness T2 which is greater than the thickness T1. As such, the protective film 48 is thinner than the protective film 62. In some embodiments, the protective films 48 and 62 are plastic films. In some embodiments, the protective films 48 and 62 are different plastic films.

As the metallic film 12 and the protective films 48, 62 pass between the scoring blade 14 and the anvil 18, the scoring blade actuator 16 moves the scoring blade 14 toward the anvil 18 to apply a pressure onto the protective film 48, the metallic film 12, and the protective film 62. As can be seen in FIG. 3, this makes a score 72 along a width of the protective film 48. The timing of the actuation of the scoring blade 14 is determined based on the speed V1 of the conveyors 20, 24 in order to obtain a desired length of the metallic film 12 once the metallic film 12 is cut. With reference to FIG. 3, once the score 72 is made, the metallic film 12 has a thickness T3 at the site of the score 72. In some embodiments, the thickness T3 is between 1 micron and 30 microns.

The pressure applied onto the protective film 48, the metallic film 12, and the protective film 62 for making the score 72 is not sufficient to cut the protective films 48, 62 so as to permit the removal from the metallic film 12 and winding onto the spools 56, 70 of the protective films 48, 62. In some embodiments, the pressure applied onto the protective film 48, the metallic film 12, and the protective film 62 for making the score 72 is not sufficient to cause the protective films 48, 62 to stick onto the metallic film 12.

As the conveyor 28 operates at a speed V2 that is greater than the speed V1 of the conveyor 24, the difference between the speeds causes the metallic film 12 to cut at the score 72 as seen in FIG. 4. The cut occurs as the score 72 in the metallic film 12 approaches the conveyor 28. In some embodiments, the metallic film 12 cuts when the score 72 is over the air bridge 30. The thickness T3 of the metallic film 12 at the site of the score 72 is sufficiently small to permit the cut to occur.

The operating speeds V1, V2 of the conveyors 20, 24, 28, the shape and hardness of the scoring blade 14, the hardness of the anvil 18, the type of protective films 48, 62, and the amount of pressure applied by the scoring blade 14 are adjusted based on the type and thickness of metallic film 12. When properly calibrated, the resulting cut at the site of the score 72 is a "clean" cut.

Once the metallic film 12 is cut, it continues to travel along the conveyor 28. A machine vision system 74 scans the cut metallic film 12 travelling on the conveyor 28 for quality control purposes. The cut metallic film 12 is then removed from the conveyor 28 by a suitable removal system.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A system for cutting a metallic film comprising:
   a scoring blade;
   a scoring blade actuator operatively connected to the scoring blade for actuating the scoring blade;
   an anvil in alignment with the scoring blade;
   a first conveyor disposed upstream of the scoring blade and the anvil;
   a second conveyor disposed downstream of the scoring blade and the anvil, the first and second conveyors operating at a first speed;
   a metallic film feeder for feeding the metallic film on the first conveyor, the first conveyor feeding the metallic film between the scoring blade and the anvil, the second conveyor pulling the metallic film from between the scoring blade and the anvil;
   a first protective film feeder for feeding a first protective film between the metallic film and the scoring blade;
   a second protective film feeder for feeding a second protective film between the metallic film and the anvil, the scoring blade actuator being operable to move the scoring blade toward the anvil to apply a pressure onto the first protective film, the metallic film, and the second protective film disposed between the scoring blade and the anvil for making a score along a width of the first protective film,
   the pressure applied not cutting the metallic film, the first protective film and the second protective film; and
   a third conveyor disposed downstream of the second conveyor, the second conveyor feeding the metallic films to the third conveyor, the third conveyor operating at a second speed, the second speed being greater than the first speed, a difference between the first and second speeds causing the metallic film to cut at the score.

2. The system of claim 1, further comprising a first air bridge between the first conveyor and the anvil.

3. The system of claim 2, further comprising a second air bridge between the anvil and the second conveyor.

4. The system of claim 3, further comprising a third air bridge between the second and third conveyors.

5. The system of claim 1, wherein the anvil is a cylindrical anvil, the cylindrical anvil being rotatable.

6. The system of claim 1, wherein the scoring blade actuator is operable to translate the scoring blade toward the anvil.

7. The system of claim 1, wherein the first protective film is thinner than the second protective film.

8. The system of claim 1, wherein the first and second protective films are first and second plastic films.

9. The system of claim 8, wherein the first and second plastic films are different plastic films.

10. The system of claim 1, wherein the metallic film is a film of alkali metal or alloy thereof.

11. The system of claim 1, wherein the first, second and third conveyors are vacuum belt conveyors.

12. The system of claim 1, wherein the metallic film has a thickness at a site of the score between 1 micron and 30 microns.

13. A method for cutting a metallic film comprising:
    feeding the metallic film between a scoring blade and an anvil at a first speed;
    feeding a first protective film between the metallic film and the scoring blade;
    feeding a second protective film between the metallic film and the anvil;
    moving the scoring blade toward the anvil for applying a pressure onto the first protective film, the metallic film, and the second protective film disposed between the scoring blade and the anvil for making a score along a width of the first protective film,
    the pressure applied not cutting the metallic film, the first protective film and the second protective film; and
    pulling the metallic film having passed between the scoring blade and the anvil at a second speed, the second speed being greater than the first speed, a difference between the first and second speeds causing the metallic film to cut at the score.

14. The method of claim 13, further comprising removing the first and second protective films from the metallic film downstream of the cutting blade and upstream of a position where the metallic film cuts at the score.

15. The method of claim 13, wherein the anvil is a cylindrical anvil; and
    the method further comprises rotating the anvil.

16. The method of claim 13, wherein the first protective film is thinner than the second protective film.

17. The method of claim 13, wherein the first and second protective films are first and second plastic films.

18. The method of claim 13, wherein the metallic film is a film of alkali metal or alloy thereof.

19. The method of claim 13, wherein the metallic film has a thickness at a site of the score between 1 micron and 30 microns.

20. The system of claim 1, further comprising:
- a first protective film winder for removing the first protective film from the metallic film upstream of the third conveyor; and
- a second protective film winder for removing the second protective film from the metallic film upstream of the third conveyor.

21. The method of claim 13, further comprising:
- removing the first protective film from the metallic film having passed between the scoring blade and the anvil before the metallic film is cut at the score; and
- removing the second protective film from the metallic film having passed between the scoring blade and the anvil before the metallic film is cut at the score.

\* \* \* \* \*